(12) United States Patent
Keith, Jr.

(10) Patent No.: US 7,572,978 B1
(45) Date of Patent: Aug. 11, 2009

(54) ELECTRICAL OUTLET BOX ASSEMBLY SYSTEM

(76) Inventor: Otis S. Keith, Jr., 15034 Collingham St., Detroit, MI (US) 48205

( * ) Notice: Subject to any disclaimer, the term of this patent is extended or adjusted under 35 U.S.C. 154(b) by 97 days.

(21) Appl. No.: 11/928,699

(22) Filed: Oct. 30, 2007

(51) Int. Cl.
*H01H 9/02* (2006.01)

(52) U.S. Cl. .............................. 174/58; 174/67; 174/66; 220/3.2; 220/241; 220/242; 33/DIG. 10; 33/528

(58) Field of Classification Search ................ 174/480, 174/481, 50, 53, 57, 58, 66, 67; 220/3.2, 220/3.8, 241, 242; 33/DIG. 10, 528, 562
See application file for complete search history.

(56) References Cited

U.S. PATENT DOCUMENTS

| | | | | |
|---|---|---|---|---|
| 2,775,812 | A | * | 1/1957 | Mohr .......................... 220/3.8 |
| 3,888,013 | A | | 6/1975 | Benoit |
| 3,924,331 | A | | 12/1975 | Goosen |
| 4,059,905 | A | | 11/1977 | Wieting |
| 4,202,388 | A | * | 5/1980 | Wieting ................. 33/DIG. 10 |
| 4,259,785 | A | | 4/1981 | Wortham |
| 4,339,973 | A | | 7/1982 | Lawrence |
| 4,589,211 | A | | 5/1986 | Policka |
| 4,802,284 | A | * | 2/1989 | Jackson ....................... 33/528 |
| D315,316 | S | | 3/1991 | Reynolds et al. |
| 5,111,593 | A | | 5/1992 | Gehen, Sr. |
| 5,172,483 | A | * | 12/1992 | Yocono et al. ................. 33/528 |
| 6,101,731 | A | * | 8/2000 | Mesa .......................... 33/528 |
| 6,403,883 | B1 | * | 6/2002 | Morgan et al. ................. 174/58 |
| 6,452,097 | B1 | * | 9/2002 | DeWall ........................ 174/58 |
| 6,463,668 | B1 | * | 10/2002 | Williams ..................... 33/528 |
| 6,511,269 | B1 | * | 1/2003 | Smasne ....................... 33/528 |
| 7,210,241 | B1 | * | 5/2007 | Bree ............................ 33/528 |

* cited by examiner

*Primary Examiner*—Angel R Estrada
(74) *Attorney, Agent, or Firm*—Crossley Patent Law; Mark A. Crossley

(57) ABSTRACT

An electrical outlet box assembly system that allows contractors to more efficiently mark the location of an electrical box when installing drywall over the electrical box so that the proper area of drywall can be later cut out over the location of the electrical box. The system includes a first panel that is placed over an electrical box after the electrical box has been attached to a stud but before the drywall has been set in place. The first panel includes a hole in which a guide bar can be installed. After the drywall has been put in place, the guide bar will pass through the drywall, allowing an individual to mount a second plate over the guide bar. The second plate has a small centrally-located hole through which the guide bar can pass through. A wing nut can be attached to the guide bar to fasten the second panel in place. When an individual is ready to remove the panels so he or she can cut out the portion of the drywall over the electrical box, the outline of the electrical box can be traced by tracing around the second panel prior to its removal. Then, the drywall can be cut out, at which time, the first panel can then be removed as well, allowing access to the interior of the electrical box.

12 Claims, 4 Drawing Sheets

ELECTRICAL OUTLET BOX ASSEMBLY SYSTEM

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention concerns that of a new and improved electrical outlet box assembly system that allows contractors to more efficiently mark the location of an electrical box when installing drywall over the electrical box so that the proper area of drywall can be later cut out over the location of the electrical box.

SUMMARY OF THE INVENTION

The present invention concerns that of a new and improved electrical outlet box assembly system that allows contractors to more efficiently mark the location of an electrical box when installing drywall over the electrical box so that the proper area of drywall can be later cut out over the location of the electrical box. The system includes a first panel that is placed over an electrical box after the electrical box has been attached to a stud but before the drywall has been set in place. The first panel includes a hole in which a guide bar can be installed. After the drywall has been put in place, the guide bar will pass through the drywall, allowing an individual to mount a second plate over the guide bar. The second plate has a small centrally-located hole through which the guide bar can pass through. A wing nut can be attached to the guide bar to fasten the second panel in place. When an individual is ready to remove the panels so he or she can cut out the portion of the drywall over the electrical box, the outline of the electrical box can be traced by tracing around the second panel prior to its removal. Then, the drywall can be cut out, at which time, the first panel can then be removed as well, allowing access to the interior of the electrical box.

There has thus been outlined, rather broadly, the more important features of an electrical outlet box assembly system that the detailed description thereof that follows may be better understood and in order that the present contribution to the art may be better appreciated. There are, of course, additional features of the electrical outlet box assembly system that will be described hereinafter and which will form the subject matter of the claims appended hereto.

In this respect, before explaining at least one embodiment of the electrical outlet box assembly system in detail, it is to be understood that the electrical outlet box assembly system is not limited in its application to the details of construction and to the arrangements of the components set forth in the following description or illustrated in the drawings. The electrical outlet box assembly system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present electrical outlet box assembly system. It is important, therefore, that the claims be regarded as including such equivalent constructions insofar as they do not depart from the spirit and scope of the present invention.

It is therefore an object of the present invention to provide an electrical outlet box assembly system which has all of the advantages of the prior art and none of the disadvantages.

It is another object of the present invention to provide an electrical outlet box assembly system which may be easily and efficiently manufactured and marketed.

It is another object of the present invention to provide an electrical outlet box assembly system which is of durable and reliable construction.

It is yet another object of the present invention to provide an electrical outlet box assembly system which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 5c shows an item of drywall after the item of drywall has been placed over a guide bar attached to the first panel that was previously attached to an electrical box.

FIG. 5d shows a second panel attached to an item of drywall by placing the guide bar through a centrally located hole in the second panel.

DESCRIPTION OF THE PREFERRED EMBODIMENT

Figure 1:
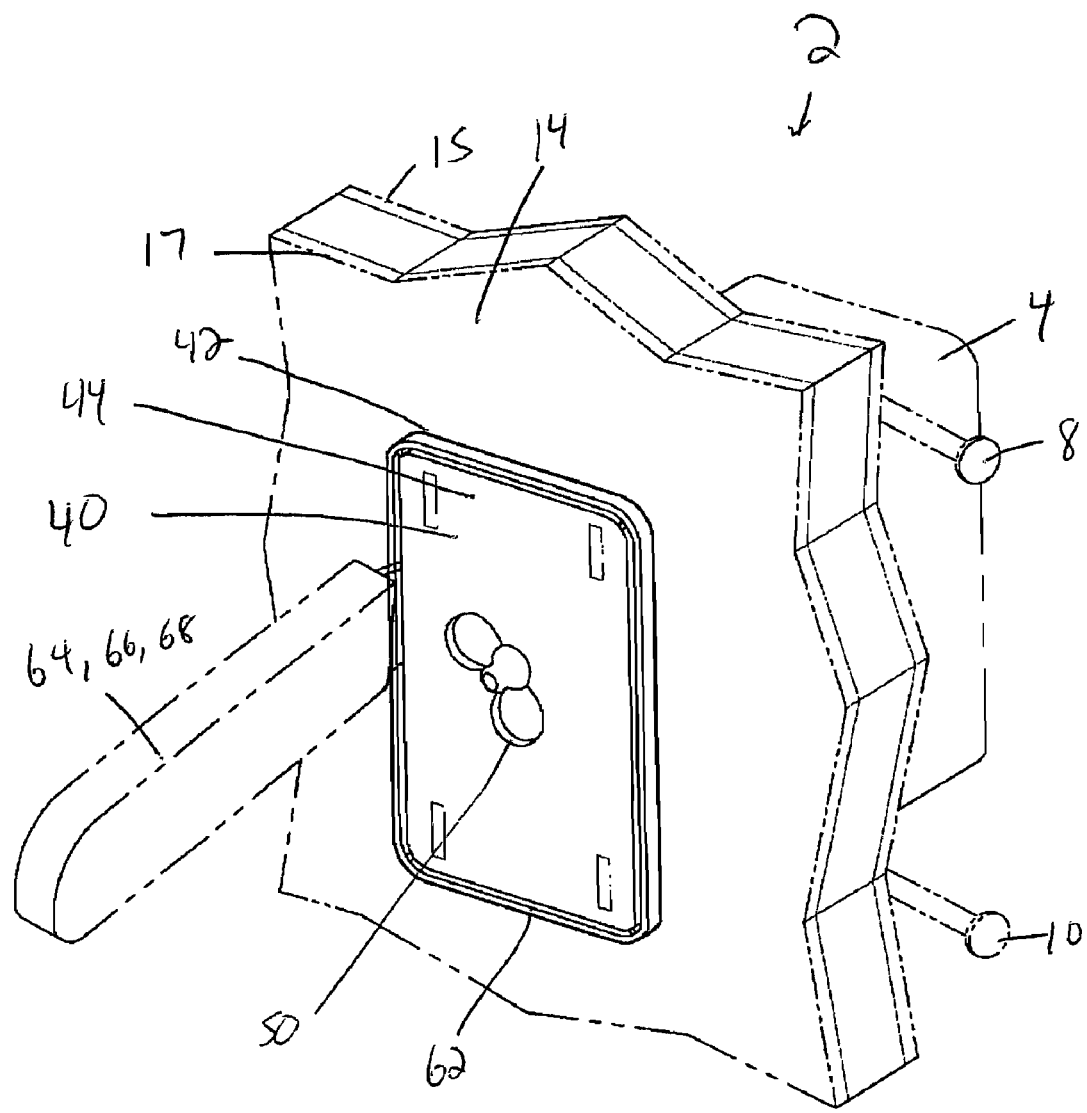
FIG. 1 shows a perspective view of the second panel as it appears attached to a portion of drywall, highlighting how an individual can cut out or mark around the second panel prior to its removal.
Figure 2:
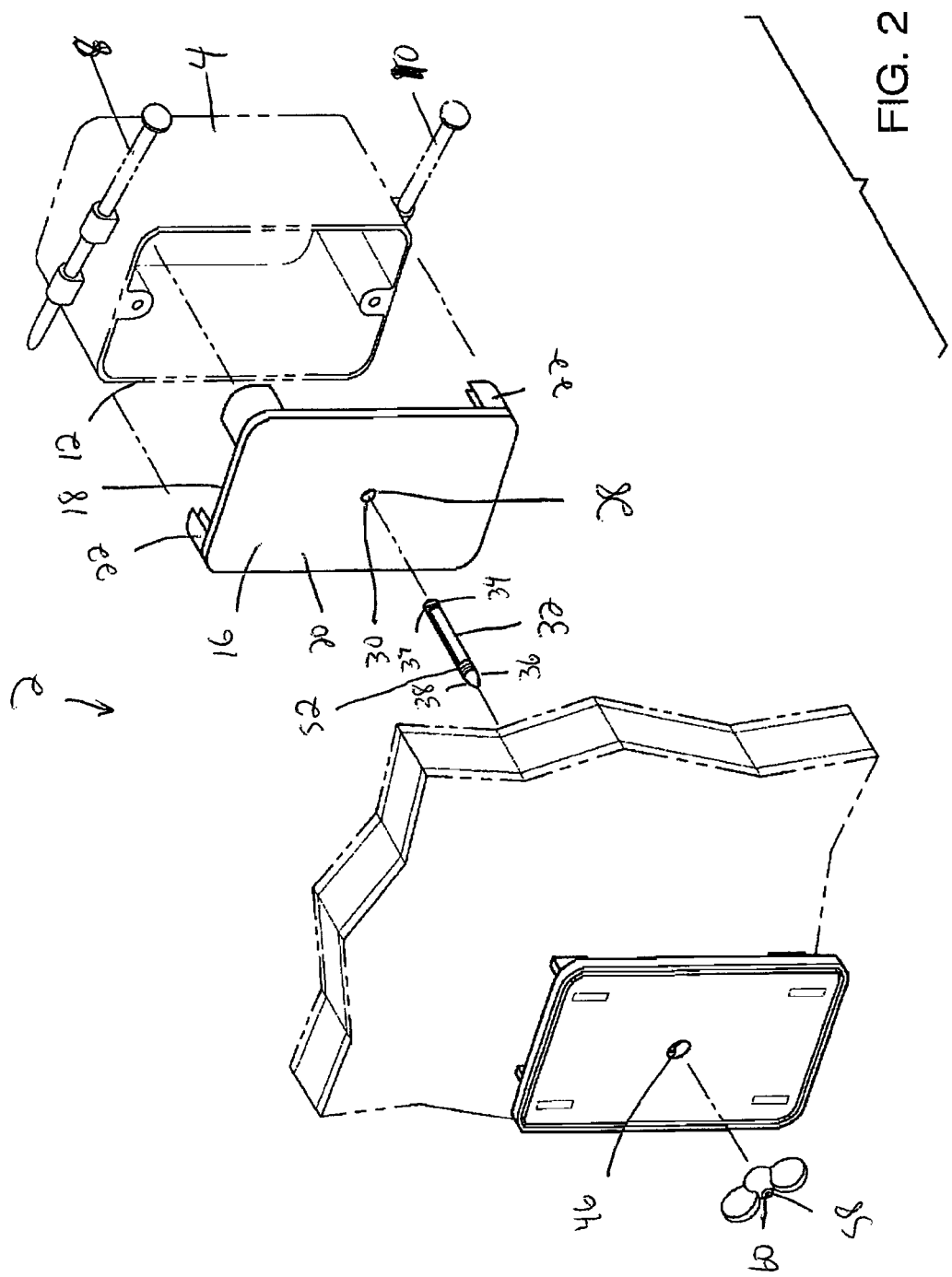
FIG. 2 shows a perspective view of the various components of the electrical outlet box assembly system.
Figure 3:
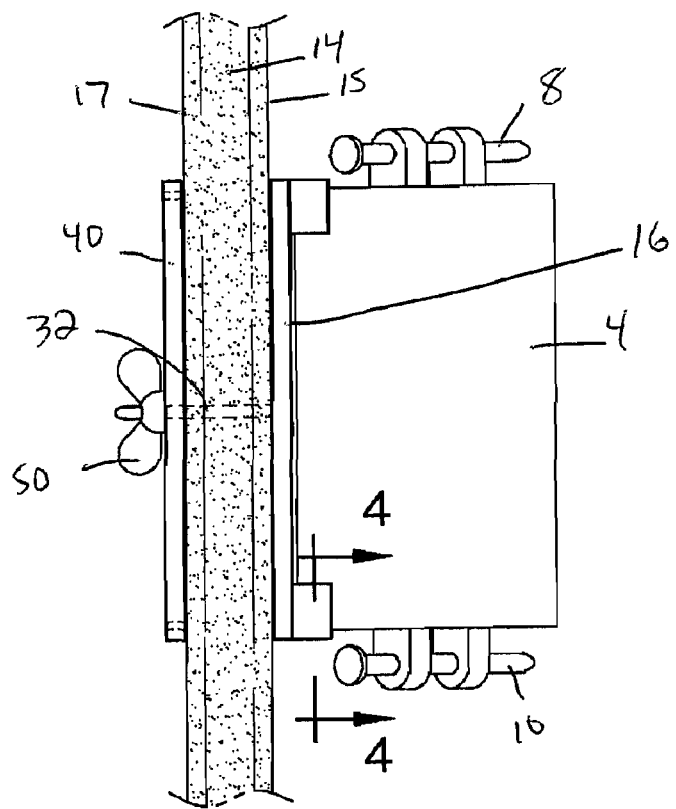
FIG. 3 shows a perspective view of the electrical outlet box assembly system as it would appear attached to a section of drywall.
Figure 4:
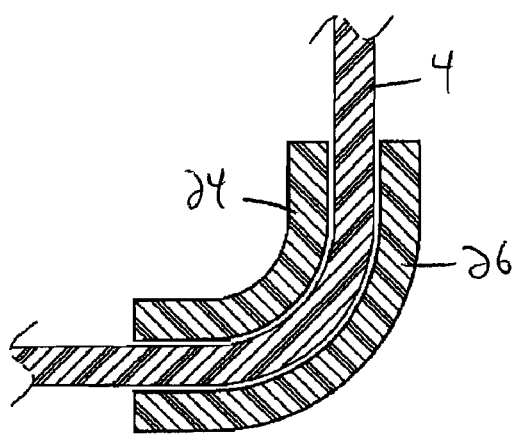
FIG. 4 shows an end view of an inner and outer clamp associated with the first panel as the first panel is shown attached to the electrical box.
Figure 5A:
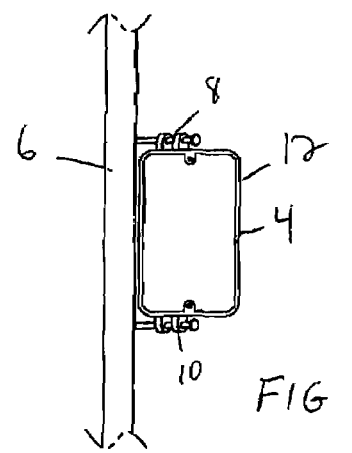
FIG. 5a shows an electrical box after the box has been fixedly attached to a stud.
Figure 5A:
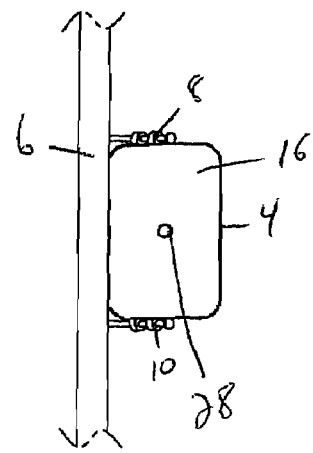
Figure 5B:
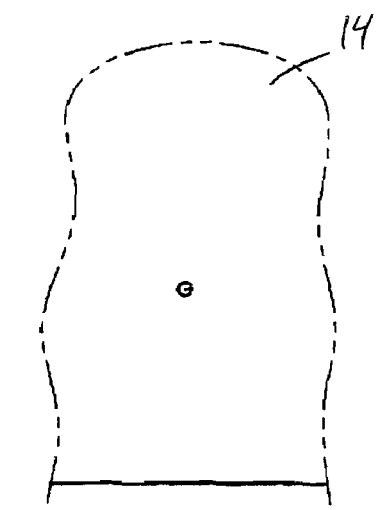
FIG. 5b shows an electrical box after a first panel has been fastened to the electrical box.
Figure 5B:
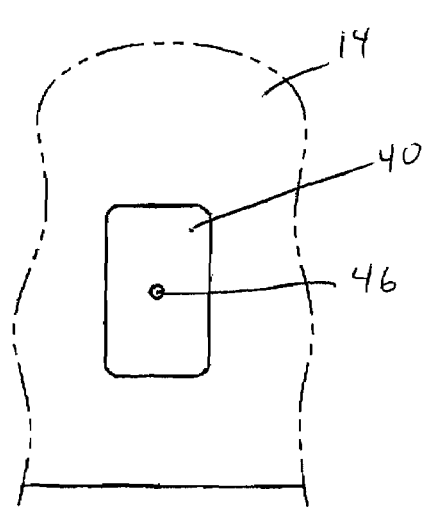

With reference now to the drawings, and in particular to FIGS. 1 through 5 thereof, a new electrical outlet box assembly system embodying the principles and concepts of the present invention and generally designated by the reference numeral 2 will be described.

As best illustrated in FIGS. 1 through 5, the electrical outlet box assembly system 2 comprises an electrical box 4 that is fixedly attached to a stud 6 by at least a pair of fasteners 8 and 10. The electrical box 4 has a front opening 12 and is designed to be installed before a sheet of drywall 14 would be attached to the stud 6 over the electrical box 4. The sheet of drywall 14 has two surfaces comprising an inner surface 15 and an outer surface 17.

A first panel 16 is designed to be removably attached to the electrical box 4. First panel 16 has two surfaces comprising an inner surface 18 and an outer surface 20. A quartet of clamps 22 are attached to the inner surface 18 of the first panel 16, with each clamp 22 comprising an inner portion 24 and an outer portion 26. When melding the first panel 16 with the electrical box 4, the electrical box 4 will be inserted into the clamp 22 in between the inner portion 24 of the first panel 16 and the outer portion 26 of the first panel 16. The portion of the electrical box 16 inserted in between the inner portion 24 and the outer portion 26 of the first panel 16 will be flush with it, thereby grasping the first panel 16 securely.

The first panel 16, like the electrical box 4, has a rectangular cross-sectional shape. The first panel 16 includes a centrally located hole 28 that has internal threads 30 in it.

Also associated with the present invention is a guide bar 32, with the guide bar 32 having two ends comprising a first end 34 and a second end 36. The first end 34 of the guide bar 32 has a plurality of external threads 37, while the second end 36 of the guide bar 32 has a point 38. After the first panel 16 is attached to the electrical box 4, the external threads 37 on the first end 34 of the guide bar 32 is threadably attached to the internal threads 30 within the hole 28 on the first panel 16.

Next, a sheet of drywall 14 is placed over the first panel 16, causing the point 38 on the second end 26 of the guide bar 32 to poke through the sheet of drywall 14.

The present invention also utilizes a second panel 40, with the second panel having two surfaces comprising an inner surface 42 and an outer surface 44. The inner surface 42 of the second panel 40 is placed against the sheet of drywall 14. The second panel 40 also has a centrally located hole 46, with the second panel 40 being positioned such that the point 38 on the second end 26 of the guide bar 32 is inserted through the centrally located hole 46.

A series of external threads 52 are located on the second end 26 of the guide bar 32 immediately adjacent to the point 38 on the second end 26 of the guide bar 32. The second panel 40 can be removably attached to the sheet of drywall 14 by attaching a wing nut 50 to a series of external threads 52 that are located on the second end 26 of the guide bar 32 immediately adjacent to the point 38 on the second end 26 of the guide bar 32. The wing nut 50 has a central hole 58 with a plurality of internal threads 60 in it, and these internal threads 60 are threadably attached to the external threads 52 on the guide bar 32 when the two are attached to one another.

At this point, an individual can mark around the perimeter 62 of the second panel 40 with some type of marking device 64. The marking device 64 can either be a writing utensil 66 or a cutting device 68. Once the perimeter 62 of the second panel 40 has been marked, the second panel 40 can be removed and the drywall within the perimeter 62 of the former location of the second panel 40 can be removed. Then, the first panel 16 can be pulled out as well, exposing the innards of the electrical box 4 so that further electrical work can be done when needed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical outlet box assembly system comprising
a stud located within a structure,
an electrical box,
means for attaching the electrical box to the stud,
means for identifying the position of the electrical box on the outer surface of a sheet in drywall after the sheet of drywall has been mounted and the inner surface of the sheet of drywall has been placed over the electrical box,
wherein the means for attaching the electrical box to the stud further comprises
a pair of fasteners comprising a first fastener and a second fastener,
wherein each fastener of the pair of fasteners is used to fasten the electrical box to the stud,
wherein the means for identifying the position of the electrical box on the outer surface of a sheet in drywall after the sheet of drywall has been mounted and the inner surface of the sheet of drywall has been placed over the electrical box further comprises
a front opening located on the electrical box,
a first panel, the first panel having two surfaces comprising an inner surface and an outer surface,
means for attaching the inner surface of the first panel to the electrical box,
a guide bar having two ends comprising a first end and a second end,
means for attaching the guide bar to the first panel,
wherein the first panel has a rectangular shape,
wherein the means for attaching the inner surface of the first panel to the electrical box further comprises
a quartet of clamps attached to the inner surface of the first panel,
wherein each clamp further comprises two portions, said portions comprising an inner portion and an outer portion,
further wherein a portion of the electrical box is inserted in between the inner portion of the clamp and the outer portion of the clamp when the electrical box is pressed against each clamp.

2. An electrical outlet box assembly system according to claim 1 wherein the means for attaching the guide bar to the first panel further comprises
(a) a guide bar having two ends comprising a first end and a second end,
(b) a plurality of external threads attached to the first end of the guide bar,
(c) a hole located on the first panel,
(d) a plurality of internal threads located within the hole on the first panel,
(e) wherein the first end of the guide bar is threadably attached to the plurality of internal threads located within the hole on the first panel.

3. An electrical outlet box assembly system according to claim 2 wherein the means for identifying the position of the electrical box on the outer surface of a sheet in drywall after the sheet of drywall has been mounted and the inner surface of the sheet of drywall has been placed over the electrical box further comprises
(a) a point located on the second end of the guide bar, (b) wherein the point penetrates through the sheet of drywall after the sheet of drywall has been placed against the stud.

4. An electrical outlet box assembly system according to claim 3 wherein the means for identifying the position of the electrical box on the outer surface of a sheet in drywall after the sheet of drywall has been mounted and the inner surface of the sheet of drywall has been placed over the electrical box further comprises
  (a) a second panel, the second panel having two surfaces comprising an inner surface and an outer surface, the second panel also having a perimeter,
  (b) a centrally located hole on the second panel,
  (c) a plurality of external threads located on the second end of the guide bar immediately adjacent to the point on the guide bar, and
  (d) means for securing the second panel to the sheet of drywall after the sheet of drywall has been fastened to the stud.

5. An electrical outlet box assembly system according to claim 4 wherein the means for securing the second panel to the sheet of drywall after the sheet of drywall has been fastened to the stud further comprises
  (a) a nut, the nut having a central hole,
  (b) a plurality of internal threads located within the central hole within the nut,
  (c) wherein the plurality of internal threads located within the central hole within the nut are threadably attached to the plurality of external threads located on the second end of the guide bar.

6. An electrical outlet box assembly system according to claim 5 wherein the system further comprises means for marking the location of the electrical box in relation to the outer surface of the sheet of drywall.

7. An electrical outlet box assembly system according to claim 6 wherein the means for marking the location of the electrical box in relation to the outer surface of the sheet of drywall further comprises
  (a) a marking device,
  (b) wherein the marking device is designed to mark on the outer surface of the sheet of drywall surrounding the perimeter of the second panel.

8. An electrical outlet box assembly system according to claim 7 wherein the marking device comprises a writing utensil.

9. An electrical outlet box assembly system according to claim 7 wherein the marking device comprises a cutting device.

10. An electrical outlet box assembly system comprising
  (a) a stud located within a structure,
  (b) an electrical box,
  (c) means for attaching the electrical box to the stud, said means further comprising (i) a pair of fasteners comprising a first fastener and a second fastener, (ii) wherein each fastener of the pair of fasteners is used to fasten the electrical box to the stud, and
  (d) means for identifying the position of the electrical box on the outer surface of a sheet in drywall after the sheet of drywall has been mounted and the inner surface of the sheet of drywall has been placed over the electrical box, said means further comprising (i) a front opening located on the electrical box, (ii) a first panel, the first panel having two surfaces comprising an inner surface and an outer surface, the first panel having a rectangular shape, (iii) means for attaching the inner surface of the first panel to the electrical box, said means further comprising (1) a quartet of clamps attached to the inner surface of the first panel, (2) wherein each clamp further comprises two portions, said portions comprising an inner portion and an outer portion, (3) further wherein a portion of the electrical box is inserted in between the inner portion of the clamp and the outer portion of the clamp when the electrical box is pressed against each clamp, (iv) a guide bar having two ends comprising a first end and a second end, (v) means for attaching the guide bar to the first panel, said means further comprising (1) a guide bar having two ends comprising a first end and a second end, (2) a plurality of external threads attached to the first end of the guide bar, (3) a hole located on the first panel, (4) a plurality of internal threads located within the hole on the first panel, (5) wherein the first end of the guide bar is threadably attached to the plurality of internal threads located within the hole on the first panel, (vi) a point located on the second end the guide bar, wherein the point penetrates through the sheet of drywall after the sheet of drywall has been placed against the stud, (vii) a second panel, the second panel having two surfaces comprising an inner surface and an outer surface, the second panel also having a perimeter, (viii) a centrally located hole on the second panel, (ix) a plurality of external threads located on the second end of the guide bar immediately adjacent to the point on the guide bar, (x) means for securing the second panel to the sheet of drywall after the sheet of drywall has been fastened to the stud, (xi) a nut, the nut having a central hole, (xii) a plurality of internal threads located within the central hole within the nut, wherein the plurality of internal threads located within the central hole within the nut are threadably attached to the
  plurality of external threads located on the second end of the guide bar,
  (e) means for marking the location of the electrical box in relation to the outer surface of the sheet of drywall, said means further comprising (i) a marking device, (ii) wherein the marking device is designed to mark on the outer surface of the sheet of drywall surrounding the perimeter of the second panel.

11. An electrical outlet box assembly system according to claim 10 wherein the marking device comprises a writing utensil.

12. An electrical outlet box assembly system according to claim 10 wherein the marking device comprises a cutting device.

* * * * *